United States Patent [19]

Dudley

[11] Patent Number: 4,617,593

[45] Date of Patent: Oct. 14, 1986

[54] VISIBLE AND NEAR INFRARED IMAGING SYSTEM

[75] Inventor: Dana Dudley, Dallas, Tex.

[73] Assignee: Texas Instruments Incorporated, Dallas, Tex.

[21] Appl. No.: 638,832

[22] Filed: Aug. 7, 1984

[51] Int. Cl.$^4$ .................... H04N 7/18; H04N 5/33
[52] U.S. Cl. .................... 358/113; 250/332; 358/167; 358/213
[58] Field of Search .............. 358/113, 167, 213; 250/332, 334

[56] References Cited

U.S. PATENT DOCUMENTS 4,178,612  12/1979  Dudley .................... 358/167
4,379,232  4/1983  Hopper .................... 358/113

Primary Examiner—Howard W. Britton
Attorney, Agent, or Firm—Alva H. Bandy; Leo N. Heiting; Melvin Sharp

[57] ABSTRACT

An improved visible and near infrared imaging system, in a first embodiment, has an optical system, chopper, improved detector, improved first and second delta frames, display, and timing and control circuits. The detector is a parallel amplification type detector with the sense lines each including a total subtraction chain. Each parallel amplifier chain is split so that two branches exist, each containing sample and hold circuits and one with a gain of $-C_s/(C_d+C_s)$ times the other. The outputs of the amplifier chains are multiplexed to the first delta frame for storage by frame for summation with the outputs of the next frame for substantially reducing the reset noise. The summed output signals are multiplexed at a 2x rate into the second delta frame for removal of the pattern noise and multiplexed out at a 1x rate for display. In a second embodiment a transversal filter receives the output of the second delta frame for performing a peaking function on the signals for improving the resolution of the displayed image.

11 Claims, 9 Drawing Figures

VISIBLE AND NEAR INFRARED IMAGING SYSTEM

BACKGROUND OF THE INVENTION

This invention relates to imaging systems and more particularly to an improved visible light and near infrared imaging system.

This application for letters patent relates to patent application Ser. No. 638,142, filed Aug. 6, 1984, For a "Signal Peaking Device For Single Line Video Input" (TI-10164) and patent application Ser. No. 638,606, filed Aug. 7, 1984, For "Monolithic Delta Frame Circuit" (TI-10167).

In the past, imager systems have included a lens system, a detector matrix, drive and read out electronics, a video processor, a timing and control means and a display means.

The detector matrix has been an array of ferroelectric elements of photoconductive elements arranged in rows and columns. With the elements in rows and columns, the detector array is X-Y addressable through X-Y address circuits.

The detector matrix is coupled to drive and read out electronics. For an array of optoelectronic semiconductor elements, as each element is shielded by a chopper the element is X and Y addressed by the drive electronics and charged to a reference voltage. As each successive element is charged the preceding charged elements are receiving photons to vary the charges thereon. Then the drive circuit again X-Y addresses each element and the image voltages are multiplexed to the video processor for processing and display. The disadvantages of the prior art imaging systems are: the video signals include reset noise, and the image resolution needs improvement.

SUMMARY OF THE INVENTION

Accordingly, it is an object of this invention to provide an improved imaging system whose video output signals are substantially free of reset noise.

Another object of the invention is to provide an improved imaging system having substantially improved image resolution.

Yet another object of the invention is to provide an imaging system substantially free of dc buildup and high speed timing complexity.

A further object of the invention is to provide an imaging system having substantially improved signal to fixed pattern noise ratio.

Briefly stated, the invention comprises an improved visible and near infrared imaging system. In a first embodiment, the invention includes a total subtraction amplifier chain circuit in the detector and first and second monolithic delta frame devices in the signal video chain for performing noise storage and subtraction functions while accomplishing offset suppression and 2x/1x conversion tasks. In a second embodiment, the invention includes, in addition to the above mentioned elements of the first embodiment, a transversal filter for providing a versatile peaking function.

The novel features believed to be characteristic of this invention are set forth in the appended claims. The invention itself, however, as well as other objects and advantages thereof may best be understood by reference to the following detailed description of illustrative embodiments when read in conjunction with the accompanying drawings.

DESCRIPTION OF THE PREFERRED EMBODIMENTS

Infrared Detector System

Figure 1:
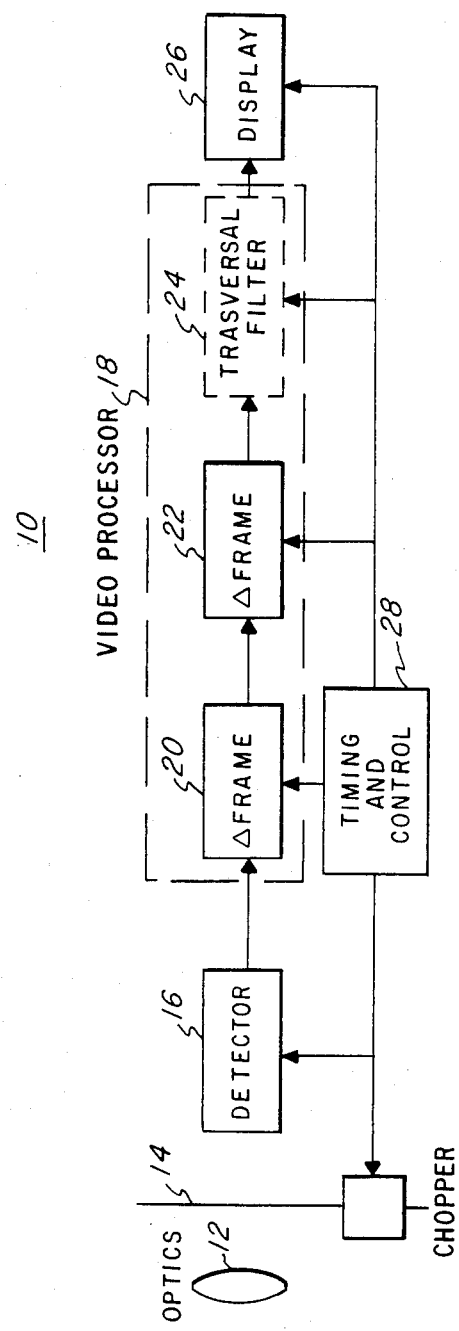
FIG. 1 is a block diagram of the first embodiment of the improved visible and near infrared imaging system and including in dashed lines the additional transversal filter block constituting the second embodiment of the invention.

Referring now to FIG. 1, an ac type infrared detector system 10 is shown for description purposes only and not by way of limitation. The infrared system 10 comprises an optical system 12, chopper 14, detector 16, video processor 18, display 26, and timing and control mechanism 28. In a first embodiment of the invention, the video processor 18 includes first and second monolithic difference (delta frames 20 and 22, and in a second embodiment, the video processor 18 also includes a tranversal filter 24.

The optical system 12 is a combination of lenses for focusing electromagnetic wave energy emanating from a scene. The chopper 14 is a mechanical chopper for interrupting the focused energy to provide intermittent signals for an ac imager system. It will be appreciated by those skilled in the art that various types of lens systems and choppers exist capable of performing the desired optical functions.

Figure 2:
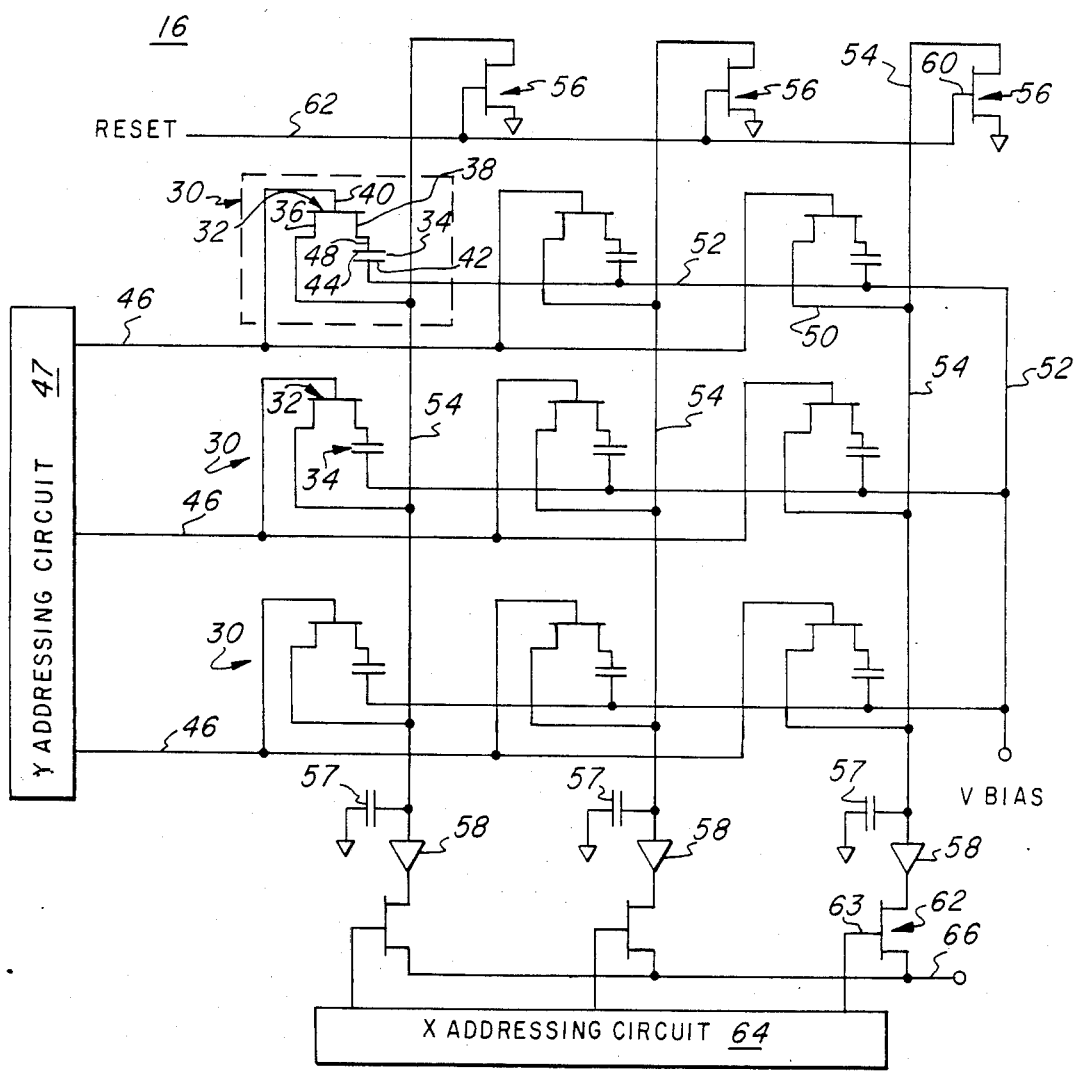
FIG. 2 is a view, partly schematic, showing one embodiment of the imaging system.

Referring now to FIG. 2, the detector 16 is, for example, a parallel amplifier array of $10^4$ elements 30 arranged in rows and columns of 100 elements each. Each element includes a solid state switch 32, and a capacitor 34. Switches 32 may be, for example, field effect transistors (FETs) formed by diffusing for each switch two N-type regions, called the drain 36 and the source 38, side by side into the surface of a P-type silicon slice. A layer of silicon oxide is grown over the surface of the silicon slice and metal strips are formed on the oxides to form the gates 40. The capacitors 34 are formed, for example, of a wafer of ferroelectric material having longitudinal lead patterns 42 and pads 44 formed on opposing major surfaces by evaporation/etching techniques. The pads and the crossover portions of the lead patterns form the plates of the capacitors 34 with the ferroelectric material forming the dielectric.

The gates 40 of the switches 32 of each row are connected by leads 46 to a Y addressing circuit 47 and the sources and drains are connected by leads 48 and 50, respectively, to the first plates 44 of capacitors 34 and to the reset lines 54 of reset switches 56 and of amplifier chain circuits 58. The inherent capacitors of the sense lines 54 are shown as capacitors 57. The second plates 42 of capacitors 34 are connected by leads 52 to v-bias. The reset switches 56 are, for example, FET switches having their gates 60 connected by lead 61 to a reset voltage source (not shown). The reset circuit is to charge the capacitors 34 to a reference voltage when shielded from light (photons) by the chopper.

The amplifier chain circuits 58, described in detail hereinafter, are connected to the drains of the FET switches 62. Switches 62 have their gates 63 connected to an X-addressing circuit 64 and their sources connected to output lead 66. Those persons skilled in the art desiring more information concerning the details of the detector structure are referred to U.S. Pat. No. 4,379,232 issued Apr. 5, 1983 to George S. Hopper, assignor to Texas Instruments Incorporated.

Total Subtraction Amplifier Chain

Figure 3A:
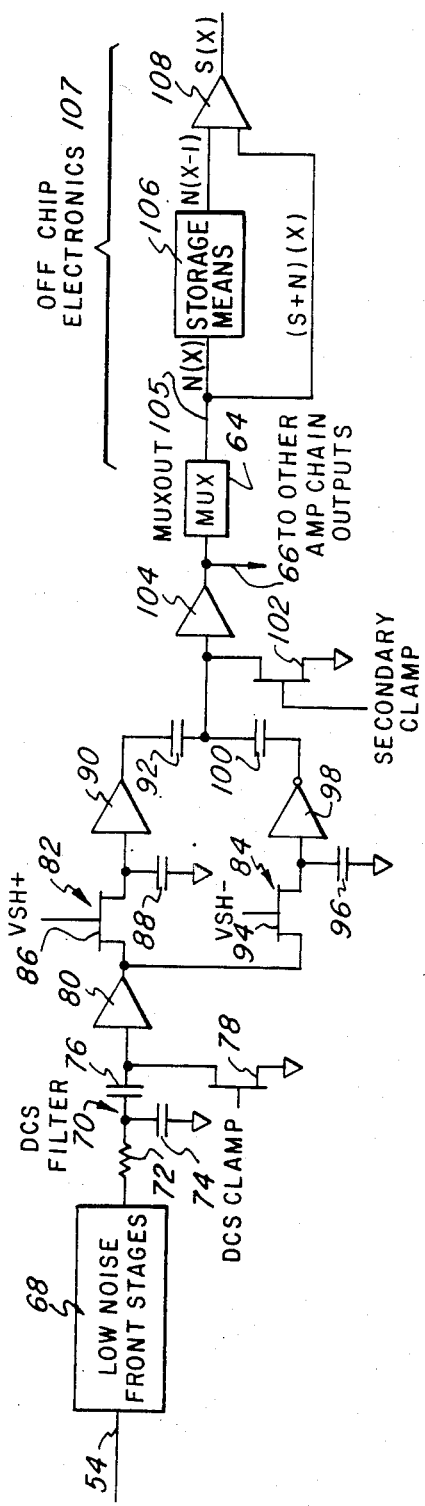
FIG. 3a is a view, partly schematic, of the total subtraction amplifier chain.

Referring now to FIGS. 2 and 3a, each of the amplifier chain circuits 58 (FIG. 2) includes a common source metal oxide semiconductor (MOS) amplifier (low noise front stages) 68 (FIG. 3a) connected to a sense lead 54 (FIG. 2). A double correlation sample filter (DCS) 70 is connected to the output of the low noise front stages 68. The DCS filter 70 includes a resistor 72 connected to the junction of capacitors 74 and 76. Capacitor 74 is grounded and capacitor 76 is connected to the junction of a DCS clamp 78 and amplifier 80. Clamp 78 is a FET switch which is turned on to store preamplifier noise on capacitor 74 and off to discharge the capacitor 74 into the load. Amplifier 80 is to restore the filtered signal. Amplifier 80 has its output connected to the junction of positive and negative sample and hold (S&H) circuits 82 and 84.

The positive S&H circuit 82 includes a FET switch 86 connected to the junction of a capacitor 88 and amplifier 90. The capacitor 88 is grounded and the amplifier 90 has its output connected to capacitor 92. Whilst, the negative S&H circuit 84 includes a FET switch 94 having its source connected to the junction of capacitor 96 and inverter amplifier 98. Inverter amplifier 98 has a gain of $-C_s/(C_d+C_s)$ times that of amplifier 90 and has its output connected to capacitor 100. A secondary clamp 102, which is a FET switch, has its source connected to the junction of capacitors 92 and 100 and amplifier 104. The FET switch of the secondary clamp can be turned on to establish a volage reference across capacitors 92 and 100. The multiplexed output of amplifier 104 is connected to the junction of off chip electronics 107 for removal of the reset noise on output lead 66. The off chip electronics 107 includes a storage means 106 connected by lead 105 to receive the multiplexed outputs of the amplifiers 104 and to the negative terminal of a summing (differencing) amplifier 108. The positive terminal of amplifier 108 is connected to receive the multiplexed outputs of amplifier 104s of multiplexer 64. The output of amplifier 108 is connected to monolithic delta frame 22 (FIG. 1) for removal of the fixed offset noise and conversion of the pixel rate. The storage means 106 (FIG. 3a) and differencing amplifier 108 of off chip electronics 107 preferable is a monolithic delta frame 20 which is capable of performing the required reset noise storage and subtraction.

The total subtraction amplifier chain is to substantially cancel reset noise that exists in the detector array. Reset noise in a detector array exists owing to the uncertainty in voltage appearing across a capacitor as that capacitor is being charged by a resistive source. The root mean square (RMS) voltage uncertainties due to reset action on detector and sense node capacitances in a detector are given by $(KT/C_d)^{\frac{1}{2}}$, and $(KT/C_s)^{\frac{1}{2}}$, respectively, where K is Boltzman's constant, T is the time, $C_d$ is the capacitance of the detector and $C_s$ is the capacitance of the sense line 54. These noises are shared together as a detector is read such that the RMS voltage present on the sense node at signal read is:

$$[(C_d/C_d+C_s)^2 KT/C_d + (C_s/C_d+C_s)^2 KT/C_s]^{\frac{1}{2}} = (KT/C_d+C_s)^{\frac{1}{2}} = RMS$$

While the RMS represents average noise the present invention utilizes the individual events of this RMS term. The individual events are determined and subtracted by the above circuit.

The value of these noise events are anticipated for each frame by measuring the values of the $(KT/C_d)^{\frac{1}{2}}$ and $(KT/C_s)^{\frac{1}{2}}$ events after the capacitances are reset by line switch 56 (FIG. 2), but before signal accumulation is begun, storing these values in the positive and negative S&H circuits 82 and 84 (FIG. 3a), summing them together in amplifier 104, storing the summed outputs for elements 30 of the first frame (N1), as in the above equation, and subtracting the elements of the first frame (N1) from the signal read samples for the corresponding element of the next frame in difference amplifier 108. In the parallel amplifier matrix, measuring the amount of voltage error existing on the detector capacitance directly after $C_d$ has been completely reset, i.e. separated from the sense node, is impossible as no sensing apparatus (amplifier) exists at that point. Thus, an indirect means of measuring detector excursions before the accumulation of signal voltage is required for parallel amplifier reset noise subtraction.

Figure 3B:
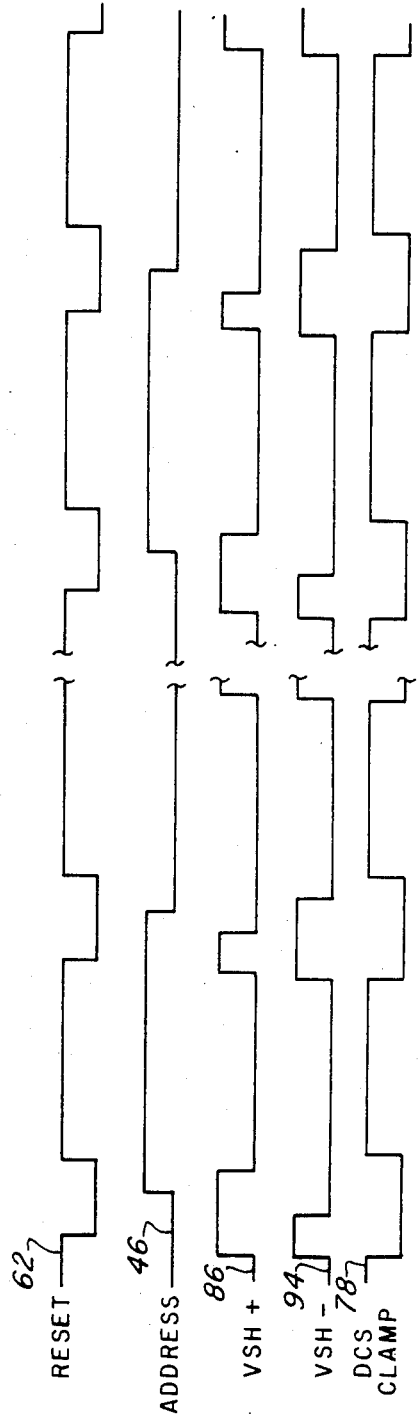
FIG. 3b is a timing diagram for the operation of the total subtraction amplifier chain.

Referring now to FIG. 3b, a description of the detector matrix timing and resulting reset noise for a parallel amplifier circuit is as follows. The detector capacitance is completely reset in two parts. In the first (1) part, the reset switch 56 (FIG. 2) resets $C_d$ and $C_s$ together and then in the second part (2) the $C_d$ is separated from $C_s$ by the opening of the address switch 32. Although $(KT/C_d)^{\frac{1}{2}}$ volts of RMS noise is left on the detector, this method of reset is required to sense the specific values of these noise events by indirect means.

The resulting reset noises are set forth in Table 1.

TABLE 1

| AFTER EVENT | NOISE VOLTAGE EXCURSION ON DETECTOR | ON SENSE NODE |
|---|---|---|
| 1 | N1 | N1 |
| 2 | N1 + N2 | N1 − $(C_d/C_s)$N2 |
| 3 | N1 + N2 + SIG | N3 |
| 4 | $C_d/(C_d + C_s)$(N1 + N2 + SIG) + $C_s$N3/$C_d$ + $C_s$ | $C_d/(CD + C_s)$(N1 + N2 + SIG) + $C_s$N3/$C_d$ + $C_s$ |

It is necessary that a whole frame time (½ chopper cycle time in which all detectors must be sampled and reset) exist between events 2 and 3 during which signal is accumulated on $C_d$. Also the $-C_d/C_s\,N2$ term present on the sense node after transition event 2 is correlated with the N2 term on the detector due to conservation of charge between $C_d$ and $C_s$ when the address switch is opened. At this point samples can be made only of the sense line, thus it is clear that this correlation between detector and sense node noises after event 2 is essential in indirectly anticipating the noise voltage present after event 4.

After each switching transition the voltage existing on the sense node is sampled such that sample:

$$S1 = N1$$

$$S2 = N1 - C_d/C_s N2$$

$$S3 = N3$$

$$S4 = C_d/(C_d + C_s)(N1 + N2 + SIG) + C_s/(C_d + C_s)N3$$

The following algorithm is used to null all reset noise terms and leave only a signal term.

$$S4 - C_s/(C_d + C_s)(S3 - S2) - S1 = C_d/(C_d + C_s)Sig$$

As a whole array address cycle or ½ chopper cycle exists between the related S1, S2 terms and S3, S4 terms, the noise storage means 106 must be capable of storing a noise sample from every detector in the array (an entire frame of noise line data) for comparison with the next frames. Thus, storage and differencing means such as, for example, a monolithic delta (difference) frame device is used as the off chip electronics 107.

Monolithic Delta Frame

The monolithic delta frames 20 and 22 (FIG. 1) are identical in construction; thus, only one need be described. The monolithic delta frame (FIG. 4) includes a high speed line address circuit 110. A demultiplexer 112 is connected to the high speed address circuit and to the video output of amplifier 104 (FIG. 3a). A line shift means 114 (FIG. 4) is connected to the demultiplexer 112. A plurality (100) of buffer amplifiers 116 are connected to the line shift register 114. Rows of elements 118 are connected to the plurality of buffer amplifiers. Each element 118 includes a capacitor 120 and a switch 122. The buffer amplifier 116 is connected to one plate of the capacitor 120. The switch 122 is a FET switch having its drain connected to a second plate of the capacitor, its gate connected by lead 124 to a low speed column (Y) address register 126 and its source connected by lead 128 to a reset circuit element 130. Again, there is one element 130 for each row (100 rows). Each line reset element includes a FET switch 132 having its gate connected to line reset lead 134, its source connected to the junction of lead 128 and amplifier 136 and S&H circuits 138. S&H circuits 138 are connected to a multiplexer 139. A high speed line address register 140 is connected to the multiplexer 139 for controlling its video output signals through video out terminal 142.

Monolithic delta frame 22 has its video in terminal connected to the video out terminal 142 of monolithic delta frame 20. The monolithic delta frame 20 performs the noise storage and subtraction functions; while, monolithic delta frame 22 accomplishes the offset suppression and 2x/1x conversion. In monolithic delta frame 20, the use of the high impedance buffer 136 on each line 128 lowers the line parasitics and the additional capacitance created by the line buffers is substantially reduced by the source follower input stage. Because of this parasitic reduction, the required capacitance of the storage capacitors 120 is low so that they may be built into the metal oxide semiconductor (MOS) IC using standard processing; hence, the name Monolithic or Integrated Delta Frame. High-speed timing requirements are made worse, however, by the addition of the buffers; therefore, the single line video input is demultiplexed line by line by demultiplexer 112 and then shifted by line shift means 114 into the parallel-input delta frame matrix. The circuit element 130 is a high-gain inverting output amplifier chain with dc feedback to suppress amplifier fixed-pattern noise offsets in a dc coupled multiplexer 138.

It will be appreciated by those persons skilled in the art that the 2x to 1x speed conversion rate can be made at either monolithic delta frame 20 or 22 by including S&H circuits 138 having common gate connections.

Figure 4:
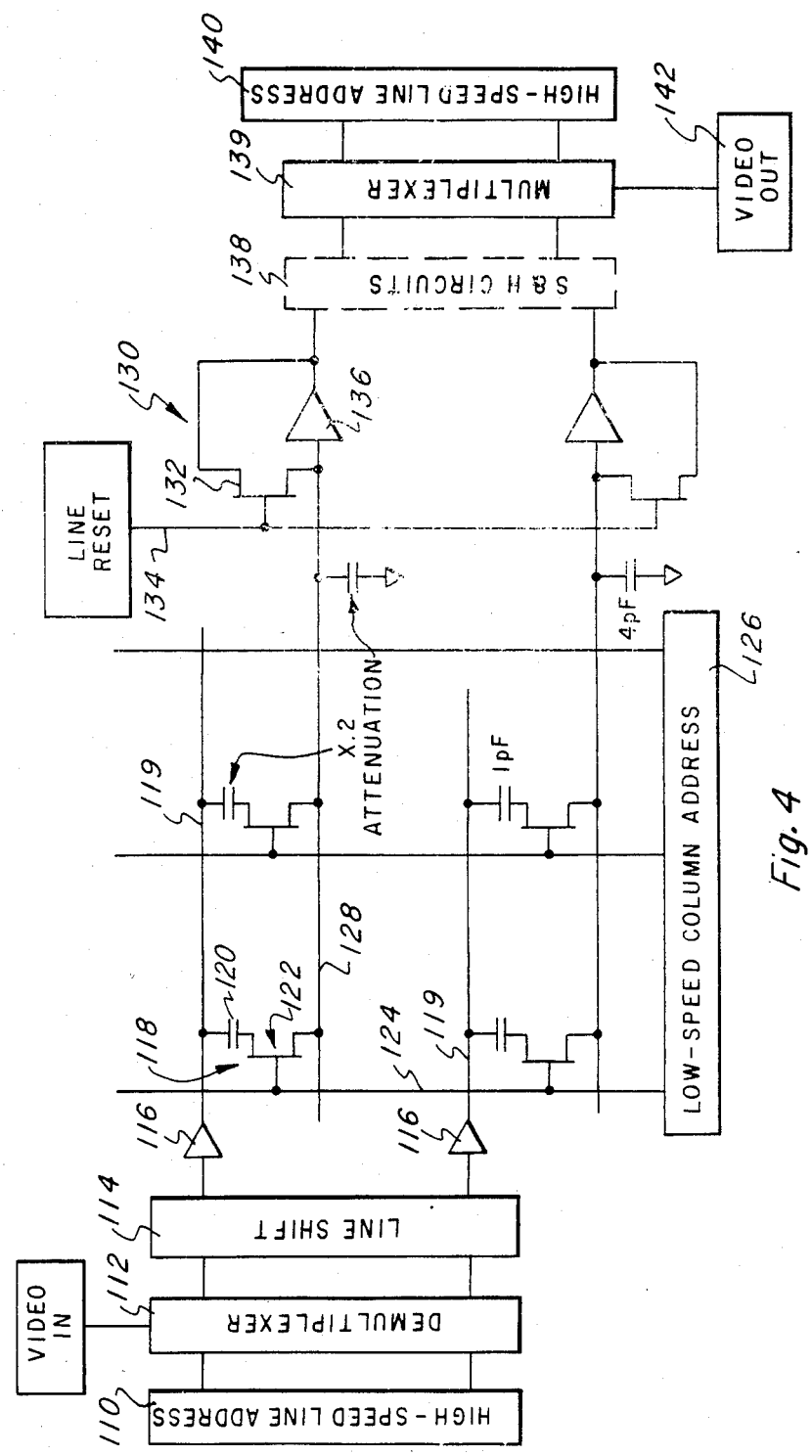
FIG. 4 is a view, partly schematic, of the integrated delta frame device.
Figure 5A:
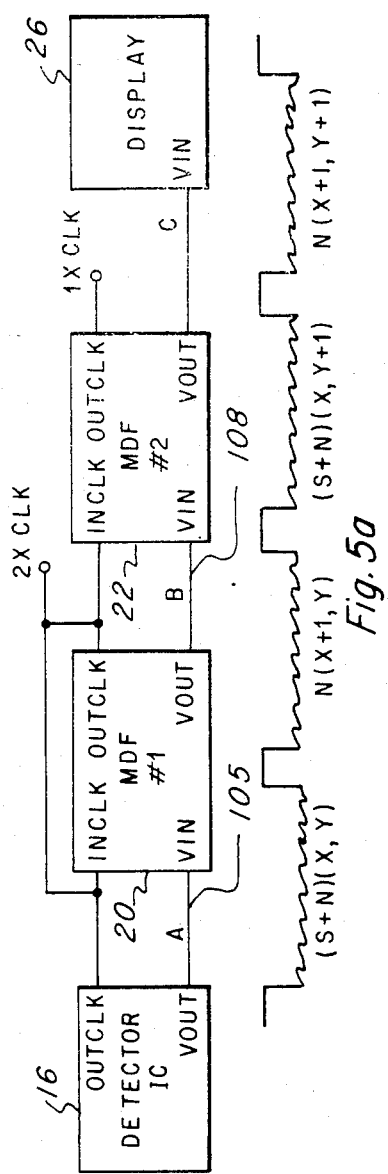
FIG. 5a is a block diagram of the first embodiment of the invention.
Figure 5B:
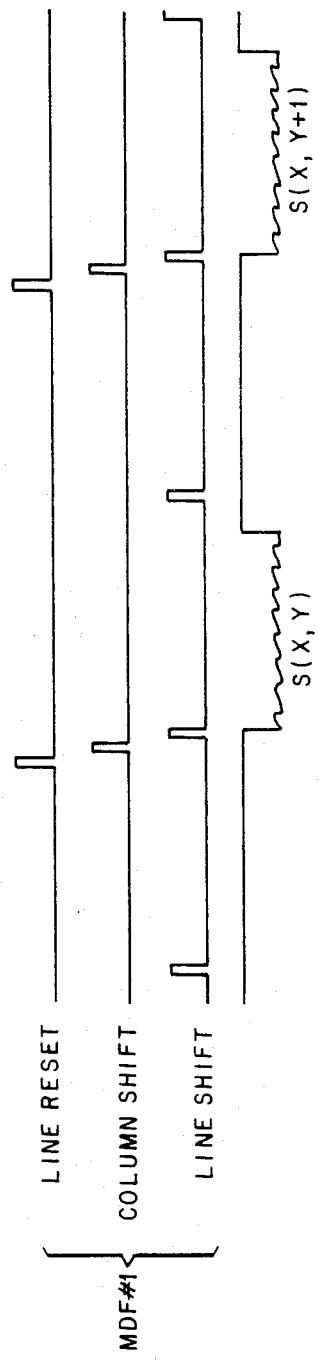
FIG. 5b is a timing diagram for the first monolithic delta frame.
Figure 5C:
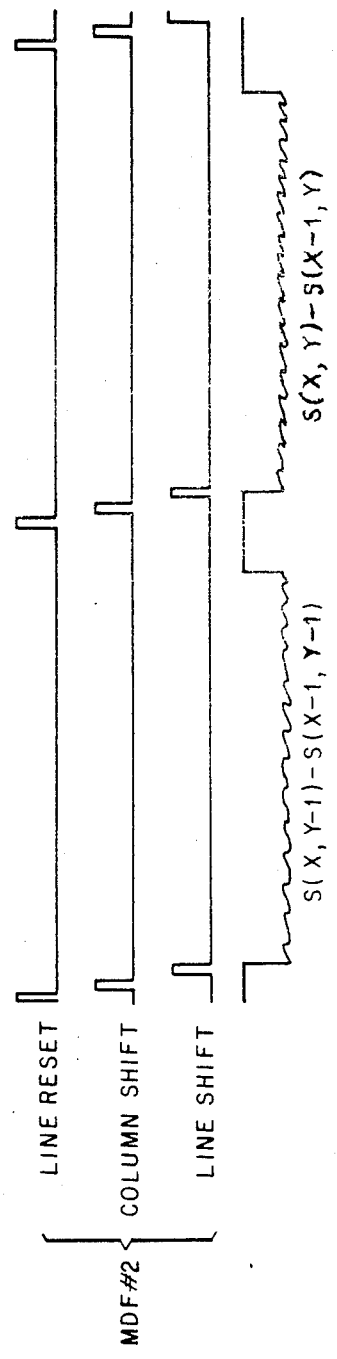
FIG. 5c is a timing diagram for the second monolithic delta frame.

Referring now to FIGS. 5a–5c, the detector 16 output is clocked into and out of the monolithic delta frame 20 and into the monolithic delta frame 22 at a 2x rate (FIG. 5b). The output of monolithic delta frame 22 (FIG. 5c) is clocked out at 1x rate to the display 26. As used in FIGS. 5a and 5c the term "column shift" refers to the shift command given to the low-speed column address shift register 126 (FIG. 4). The arguments X and Y FIGS. 5b & 5c) refer to the frame and column numbers, respectively, and the S to the signal. It should be noted also that because of the line shift feature of the monolithic delta frames there is a 2x line delay through each of the frames; i.e. the effect of a signal line input is not present at the outputs until one 2x line time later. As the storage action of the monolithic delta frame takes place when the line reset command is given, the timing diagram for monolithic delta frame 20 (FIG. 5b) indicates that the storage command for monolithic delta frame 20 takes place only after a noise line has been shifted into the matrix by the line shift pulse. Thus fulfilling the noise storage requirement when an S+N line is shifted into the capacitor matrix thereof. As the noise line data from the previous frame is still present in the form of voltage on storage capacitors, only the S portion of the S+N voltage data feeds through the capacitors into the sense lines. The amplifiers on each sense line passes its signal voltage on to be read out by the output multiplexer.

After the noise subtraction operation, there is no longer an S+N and N line for each column of detectors, but only a signal line. Nevertheless, this signal line is still clocking at the 2x pixel rate. To minimize display blank time the line data rate is converted to a 1x rate by the second monolithic delta frame which also subtracts fixed pattern noise. Thus, this monolithic frame detector is an improvement over the "Delta Frame Circuit" of U.S. Pat. No. 4,178,612, issued Dec. 11, 1979.

Transversal Filter

Figure 6:
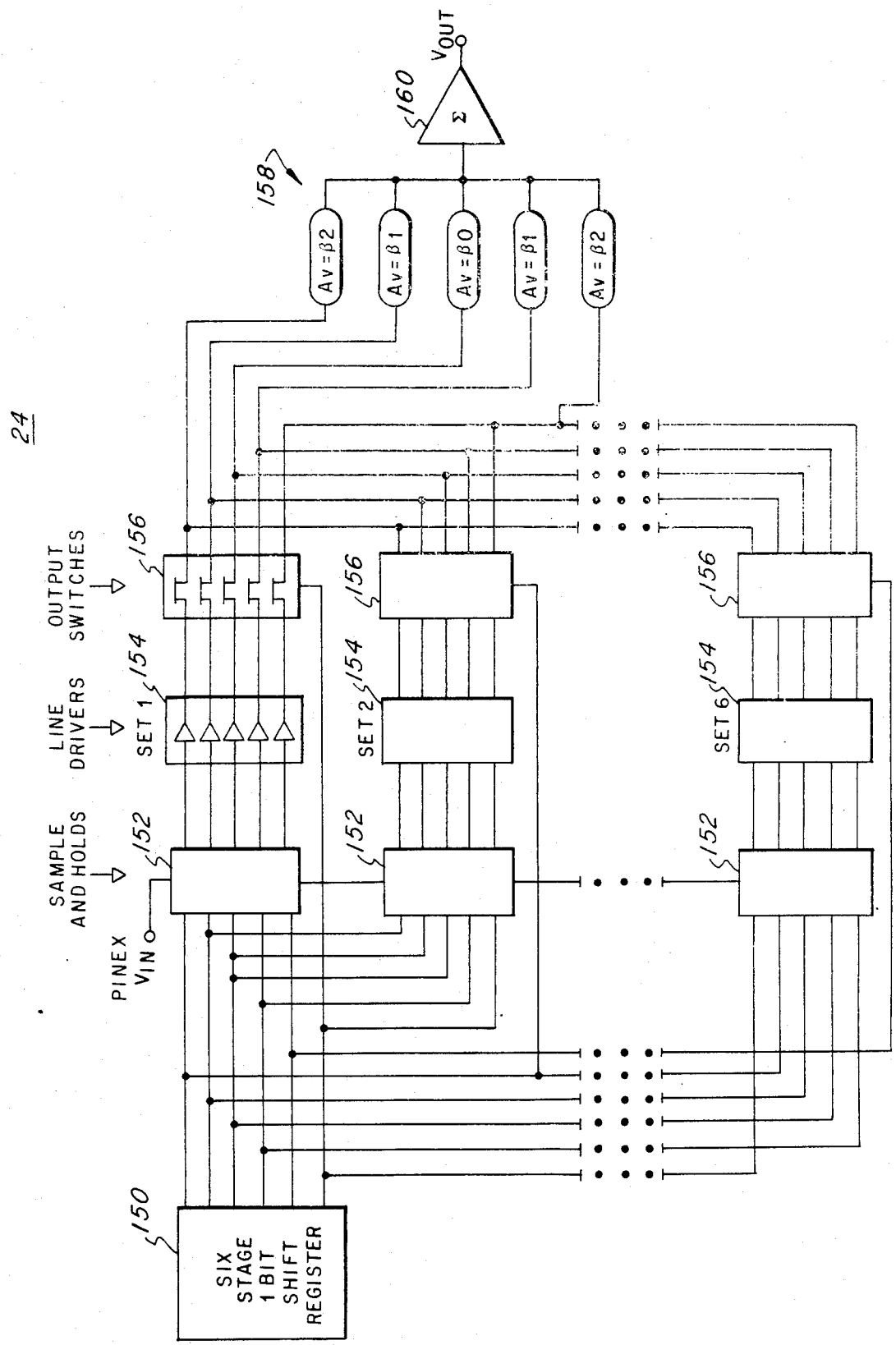
FIG. 6 is a block diagram of the transversal filter.

The transversal filter 24 (FIG. 6) of the second embodiment is connected to the second monolithic delta frame circuit 22 (FIG. 1) for peak signal detection to improve display resolution. It includes, for example, a 6-stage, 1 bit free-running digital shift register 150 (FIG. 6) connected to a corresponding number of sets (6) of S&H circuits 152. The sets of S&H circuits are connected to the output of the second monolithic delta frame 22 (FIG. 1) for receiving the video inputs and to a corresponding number of sets of line driver amplifiers 154 (FIG. 6) to a corresponding number of sets of output switches 156. Each set of S&H circuits 152 contain five S&H circuits connected to five consecutive bits of the shift register 150. Each set of line drivers 154 includes five amplifiers connected to the five S&H circuits of each corresponding set thereof. While, each set of output switches 156 has five transistor switches connected to the five amplifiers of each corresponding set thereof. The sixth bit of the shift register 150 is selectively connected to each set of output switches 156 for sequentially operating each set of output switches. Five voltage weighting circuits 158 are connected to the five output switches of each set of output switches, and the outputs of the weighting circuits are connected to a summer 160. The output of the summer 160 is connected to the display 26 (FIG. 1).

The transversal filter 24 has its S&H circuits connected to the single line video output of monolithic delta frame 22 and performs a peaking function thereon. The six stage, 1 bit shift register 150 addresses sequentially the six sets of S&H circuits 152 to store each pixel of information in five places simultaneously (see Table 2).

2-6 are read out for weighting pixels 2-6 to complete the cycle. Next, the cycle is repeated to input pixels 7-12 to determine their peak value and thereafter the cycle repeated until completion.

Assuming Beta 0=1.63, Beta 1=−0.25 and Beta 2=0.0625 and further assuming zero values for pixels 1-5, a one for pixels 6-8 and a zero for pixels 9-13 the outputs of summer 160 are: 0, 0, −0.25, +1.6, −0.25, +0, −0.19, 0, 0, −0.25, +1.4 and +1.4. Without the filter the corresponding values are zeros for pixels 1-5, ones for pixels 6-8 and zeros for pixels 9-12. Thus a comparison of the peak values with the digital values readily shows the improvement in resolution for the image displayed.

Although preferred embodiments of the present invention have been described in detail, it is to the understood that various changes, substitutions and alterations can be made therein without departing from the scope of the invention as defined by the appended claims.

What is claimed is:

1. An imaging system comprising:
   (a) an optical system for focusing energy emanating from a scene;

TABLE 2

| S REG. OUTPUT | STAGE #1 S & H NODE | STAGE #2 S & H NODE | STAGE #3 S & H NODE | STAGE #4 S & H NODE | STAGE #5 S & H NODE | STAGE #6 S & H NODE |
|---|---|---|---|---|---|---|
| 1 | 1 | SW OUT | 5 | 4 | 3 | 2 |
| 2 | 2 | 1 | SW OUT | 5 | 4 | 3 |
| 3 | 3 | 2 | 1 | SW OUT | 5 | 4 |
| 4 | 4 | 3 | 2 | 1 | SW OUT | 5 |
| 5 | 5 | 4 | 3 | 2 | 1 | SW OUT |
| 6 | SW OUT | 5 | 4 | 3 | 2 | 1 |

The sixth bit is used to read out a set of S&H circuits when the correct sequence of pixels is stored in that set. The five pixels of the set read out are voltage weighted by the weighting circuits 158 and applied to the summer 160. Pixel tracing is shown in Table 3.

TABLE 3

| PIXEL | STAGE #1 S & H NODE | STAGE #2 S & H NODE | STAGE #3 S & H NODE | STAGE #4 S & H NODE | STAGE #5 S & H NODE | STAGE #6 S & H NODE |
|---|---|---|---|---|---|---|
| 1 | 1 | SW OUT | 5 | 4 | 3 | 2 |
| 2 | 2 | 1 | SW OUT | 5 | 4 | 3 |
| 3 | 3 | 2 | 1 | SW OUT | 5 | 4 |
| 4 | 4 | 3 | 2 | 1 | SW OUT | 5 |
| 5 | 5 | 4 | 3 | 2 | 1 | SW OUT |
| 6 | SW OUT | 5 | 4 | 3 | 2 | 1 |
| 7 | 1 | SW OUT | 5 | 4 | 3 | 2 |
| 8 | 2 | 1 | SW OUT | 5 | 4 | 3 |
| 9 | 3 | 2 | 1 | SW OUT | 5 | 4 |
| 10 | 4 | 3 | 2 | 1 | SW OUT | 5 |
| 11 | 5 | 4 | 3 | 2 | 1 | SW OUT |
| 12 | SW OUT | 5 | 4 | 3 | 2 | 1 |
| 13 | 1 | SW OUT | 5 | 4 | 3 | 2 |
| 14 | 2 | 1 | SW OUT | 5 | 4 | 3 |
| 15 | 3 | 2 | 1 | SW OUT | 5 | 4 |
| 16 | 4 | 3 | 2 | 1 | SW OUT | 5 |
| 17 | 5 | 4 | 3 | 2 | 1 | SW OUT | in operation of the transversal filter (FIG. 6 & Table 3), pixel 1 is stored simultaneously in S&H circuits 152, stages 1,3,4,5 and 6 at pin locations 1,5,4,3, and 2, respectively; the switch out bit is connected to stage 2, pin 6. The remaining pixels 2-5 for one frame together with the switch out bit are sequentially stored at succeeding pin locations of the stages for the first cycle. The number of stages determines the length of the filter. With the sixth bit of shift register, switch out of stage 1 occurs, pixels 1-5 are weighted in weighting circuits 158 and summed by summer 160 for providing peak voltage for pixel 1, while, pixel 6 is stored in positions 5-1 of stages 2-6, respectively. Next, with each new bit, stages including a plurality of detector elements arranged in rows and columns, each element having a solid state switch and a temperature sensitive capacitor operatively connected to the switch, said switch for selectively charging the capacitors; and
   (c) a plurality of amplifier chain circuit means operatively connected to the columns of detector elements for reducing substantially the reset noise of the detector means in the electrical signals.

2. An imaging system according to claim 1 wherein the detector means further includes a Y address circuit operatively connected to the rows of detector elements for addressing the incoming signals into the detector elements by rows, and a plurality of reset switches, an X address circuit and a plurality of sense lines, the plurality of sense lines operatively connected to columns of the detector elements, plurality of reset switches and X address circuit whereby when the reset switches are turned off prior to turn off of the switches of the detector elements, the reset noise is sampled in two parts for indirect determination of noise on the detector elements' capacitor by the amplifier chain circuit means.

3. An imaging system according to claim 1 wherein the plurality of amplifier chain circuit means includes a plurality of amplifier chain circuits producing signals constituting preselected gain ratios between two samples, a multiplexer for multiplexing the signals and a memory and subtraction means for subtracting reset or offset noise from the signals.

4. An imaging system according to claim 3 wherein the plurality of amplifier chain circuits comprises a plurality of amplifier stages operatively connected to the sense lines for the columns of detector elements, a plurality of positive and negative sample and hold circuit means having preselected gain ratios, the plurality of positive and negative sample and hold circuit means operatively connected to the plurality of amplifier stages for producing an internal sum node, and a multiplexer for multiplexing the outputs of the amplifier chains into a single line video output.

5. An imaging system according to claim 3 wherein the memory and subtraction means is a delta frame device.

6. An imaging system according to claim 1 further including a signal peaking means operatively connected to the plurality of amplifier chain circuit means for enhancing the resolution of the electrical signals representative of the scene for display.

7. An imaging system according to claim 6 wherein the signal peaking means is a transversal filter.

8. An imaging system according to claim 1 further including a mechanical chopper for interrupting the focused energy of the optical system to provide intermittent signals for an ac imaging system.

9. An imaging system according to claim 1 further including a display means for producing a visible image thereof.

10. An imaging system comprising:
 (a) an optical system for receiving and focusing energy emanating from a scene;
 (b) a detector means having a plurality of detector elements arranged in rows and columns, each detector element having a solid state switch and temperature sensitive capacitor, reset circuit means for setting the plurality of detector circuits to a reference voltage, a plurality of sense lines connected to the rows of detector elements and Y and X address circuits connected, respectively, to rows of detector elements for inputting the energy signals and to the plurality of sense lines for outputting signals representative of the energy impinging on the detector elements together with reset and offset noise;
 (c) a plurality of amplifier chain circuits connected to the sense lines for the columns of detector elements, the plurality of amplifier chain circuits including a plurality of amplifier stages and a plurality of sample and hold circuits whereby when the reset switches are turned off prior to the detector element switches, the reset noise is sampled in two parts for indirect determination of noise on the detector element capacitors by the amplifier chain circuits;
 (d) a multiplexer and a first delta frame, the multiplexer connected to the plurality of amplifier chain circuits for multiplexing their outputs to the delta frame for removal of reset noise; and
 (e) a second delta frame connected to the first delta frame for removing offset noise from the signals representative of the energy impinging on the detector elements.

11. An imaging system according to claim 10 further including a display means connected to the second delta frame for displaying a visual representation of the scene.

* * * * *